United States Patent [19]

Brouzes

[11] 4,208,283
[45] Jun. 17, 1980

[54] PROCESS FOR TREATMENT OF WASTE WATERS

[75] Inventor: Raymond J. Brouzes, Montreal, Canada

[73] Assignee: Domtar Inc., Montreal, Canada

[21] Appl. No.: 871,201

[22] Filed: Jan. 23, 1978

Related U.S. Application Data

[63] Continuation-in-part of Ser. No. 741,957, Nov. 15, 1976, abandoned.

[51] Int. Cl.$^2$ .................... C02B 1/20; C02B 1/36; C02C 1/40
[52] U.S. Cl. .................... 210/50; 210/51; 210/53; 210/62; 210/64
[58] Field of Search ............ 210/18, 42 R, 45, 50–53, 210/62, 64

[56] References Cited

U.S. PATENT DOCUMENTS

| | | | |
|---|---|---|---|
| 1,973,168 | 9/1934 | Henderson et al. | 210/62 |
| 3,080,315 | 3/1963 | Silvey | 210/62 |
| 3,345,288 | 10/1967 | Sontheimer | 210/53 |
| 3,577,341 | 5/1971 | Keith et al. | 210/53 |
| 3,645,893 | 2/1972 | Rohrer | 210/52 |
| 3,915,853 | 10/1975 | Luck | 210/51 |
| 3,947,350 | 3/1976 | Cardinal | 210/18 |

OTHER PUBLICATIONS

Mulbarger et al., "Lime Clarification, Recovery, Reuse" JWPCF, Dec. 1969, pp. 2070–2085.

Primary Examiner—Charles N. Hart
Assistant Examiner—Peter A. Hruskoci
Attorney, Agent, or Firm—C. A. Rowley

[57] ABSTRACT

A process for treating aqueous industrial or municipal effluent is described, wherein the effluent is treated with lime to a pH of at least 11.0 allowed to settle and the supernatant liquid treated with chlorine at the high pH. A substantially complete kill of micro-organisms, particularly coliforms, is thereby achieved. The liquid, after adjustment to suitable pH, may be returned to natural water streams.

13 Claims, 1 Drawing Figure

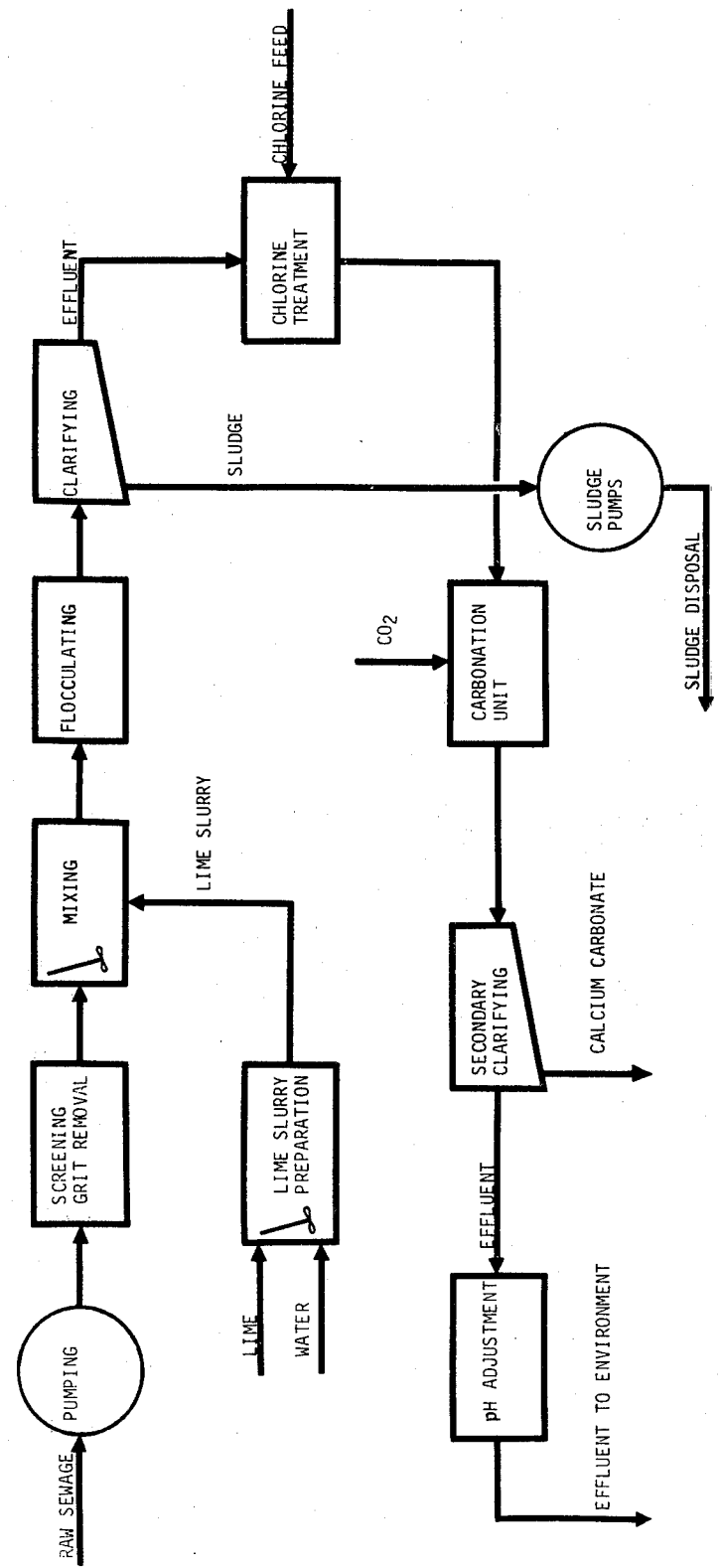
FIGURE I

PROCESS FOR TREATMENT OF WASTE WATERS

This application is a continuation-in-part application of Application Ser. No. 741,957, filed Nov. 15, 1976, now abandoned.

The present invention relates to the treatment and disposal of waste waters, in particular municipal sewage.

BACKGROUND OF THE INVENTION

Many processes have been proposed for the treatment of municipal sewage, and a number of them are in operation. The purpose of such treatment is essentially to separate the solids, whether dissolved or suspended, from the water in which they are carried, so that the residual water, adequately clarified, disinfected and generally rendered harmless to the environment, can be returned to the streams and rivers.

It is known to use lime for the treatment of sewage, usually as one step in a multistep operation. The addition of lime is remarkably effective for the precipitation and the removal of phosphates, which are usually present in abundance in the municipal waste water; it aids in the settling or organic solids, primarily suspended solids; it reduces the COD and BOD of the residual water; and also greatly reduces the number of bacteria and kills viruses and other micro-organisms usually present in waste waters. Lime treatment is sometimes used in primary treatment of sewage, and is then followed e.g. by biological treatment of the residual waters or by treatment with activated carbon. In other cases lime is used in tertiary stage treatment following conventional primary and secondary stages (Lake Tahoe).

It has also been shown that a two-stage lime treatment, where the first stage consists of treatment with lime to a pH greater than 11, followed by clarification; and the second stage consists of adjustment to a pH less than 9.5, e.g. by carbonization, followed by a secondary clarification stage. This two-stage treatment will reduce the concentration of phosphates and magnesium ions in the effluent. However, such lime-treated effluents may still contain a certain amount of bacteria.

It is known to chlorinate waters of various types, in particular the effluent from primary and secondary treatment, to reduce the bacteria content of the water and render it biologically safe. However, when such treated effluents from industrial or municipal waste are treated with chlorine, toxic or otherwise undesirable compounds are formed, e.g. chloramines from the reaction of chlorine with ammonia or chlorinated hydrocarbons as a result of reaction with organic compounds.

BRIEF DESCRIPTION OF THE INVENTION

I have found that if waste-water containing bacteria e.g. raw sewage, is treated with lime to a pH of at least 11.0 and at such pH is treated with chlorine, a substantially complete kill of coliforms is achieved in the wastewater and the risk of formation of toxic chlorine compounds is substantially reduced.

Accordingly, the present invention provides a process for treating industrial or municipal wastewater containing micro-organisms wherein the wastewater is mixed with a material containing a compound of the group consisting of calcium oxide and calcium hydroxide thereby to form a mixture having a pH of at least 11.0 where the mixture contains solids in suspension in a liquid, the mixture is treated to separate at least a portion of the solids from the liquid the liquid at pH of at least 11.0 is treated with chlorine until the total residual chlorine content (TRC) of the aqueous medium is at least 0.1 parts per million.

The single FIGURE of the drawing shows a schematic representation of the process of the invention.

DETAILED DESCRIPTION OF THE INVENTION

The treatment with lime is carried out essentially in a known manner, e.g. by continuously introducing a lime slurry at a suitable rate into a continuous stream of raw sewage, or by adding a lime slurry to the sewage in a tank, or in any other suitable manner. Quicklime may be used instead of hydrated lime and it will be understood that the term "lime", as herein used, will denote either the oxide or the hydroxide of calcium, either in dry form or as a slurry. The term sewage, as herein used, will denote any form of municipal or industrial wastewater, which usually contains micro-organisms in addition to the many organic and inorganic waste products carried away in the effluents, e.g. from modern urban agglomerations or some industrial establishments.

The lime is throughly mixed into the sewage to ensure uniform distribution and to facilitate contact of the lime with the various compounds in the sewage with which it is desired that it shall react. The quantity of lime that has to be added will depend on the type of sewage, the hardness of the water, and so on. For example, in hard water (containing large amounts of bicarbonate) more lime will be required than in "soft water". In any case, enough lime must be added to raise the pH of the mixture to at least 11.0, however it is preferred to add lime to a pH of at least 11.5.

The mixture is then treated to separate from it a sludge containing at least a portion, but preferably most, of the solids contained in the mixture, and to leave behind a relatively clarified aqueous medium. The separation is conventionally achieved, e.g. by settling in a clarifier, the latter being generally a large vessel maintained in relative quiescence, where the solids are allowed to settle to the bottom, while the supernatant liquid is allowed to overflow. It is preferred, however, prior to passing the mixture to the clarifier, to keep it for a certain time under mild agitation, so as to allow the necessary reactions (such as the formation of various calcium phosphate salts, magnesium hydroxide, etc.) to take place, and also to help in the floculate and agglomerate in the presence of lime and which will subsequently settle out in the clarifier. Thus, as shown in the particular embodiment illustrated in the drawing, the mixture is first introduced into a flocculator and from there passed into the clarifier for settling.

Since this process is generally carried out continuously, it is necessary to co-ordinate the inflow of the mixture, the outflow of clarified medium and the dimensions of the clarifier vessel, to allow adequate residence time of the mixture in the vessel for the proper settling of the solids, the so-called sludge. The sludge will contain substantially all the solid organic material which has been flocculated and precipitated, as well as substantially all phosphates precipitated in the form of calcium salts, and also most heavy metal ions, such as copper, nickel, etc., which may be present particularly in industrial waste-waters. The precipitation of organic material will generally result in a reduction of BOD and COD in the effluent of 50–80%, as well as a reduction in colour, turbidity, etc. This may be sufficient in some cases for the effluent to be returned to the natural water streams, but in other cases, where the remaining BOD and COD are still too high to meet existing standards, additional secondary treatment aimed at further reduction of the oxygen demanding substances may be necessary. The sludge containing substantial quantities of calcium carbonate and calcium hydroxide is essentially odour free and remarkably free of bacteria and may be used for land fill or for agricultural uses, particularly on acidic soils. Alternatively, the sludge may be calcined as a means of disposing of the organic material and recovering the calcium oxide for reuse in process. Such cyclic operation, however, is economically advantageous only in large treatment plants.

The clarified or supernatant effluent is then treated with chlorine. By "chlorine" in the present context is understood chlorine gas or a compound containing reactive or available chlorine, e.g. hypochlorite, hypochlorous acid, chlorine dioxide and the like. Preferred use is made of chlorine gas. This effluent is still at the high pH of at least 11.0 as a result of the preceding treatment with lime and this is an important feature of the invention. Chlorine may be introduced directly into the clarifier at a suitable location for dispersion in the supernatant liquid, but preferably it is added to the effluent after the latter has been removed from the clarifier. Chlorinators which permit controlled introduction of chlorine into a liquid are well known, and the rate and quantity of chlorine allowed to flow can be carefully metered. Sufficient chlorine is added to ensure substantially total destruction of bacteria but the actual quantity of chlorine that is needed for this purpose may be difficult to determine beforehand and, in any case, will vary with various effluents depending on the presence of various substances. For example, the presence of reducing substances, such as organic matter or sulphide, will use up additional chlorine. This is why the common way to ensure that "sufficient" chlorine has been added, is to check for the presence of free chlorine in the water at a certain time after the introduction of the chlorine: if a certain amount of free chlorine remains in the water, it is an indication that sufficient chlorine was added initially. This amount of chlorine remaining in the water and representing the difference between the amount initially applied and that used up by the water, is generally called "total residual chlorine" (TRC). The TRC is usually measured at a certain time, e.g. 15 minutes, after the introduction of chlorine is terminated. Even small quantities of residual chlorine, of the order of 0.1 ppm, are an indication that chlorination has been, by and large, completed. The residual chlorine is measured by a variety of methods, some of which are described in "Standard Methods for the Examination of Water and Wastewater", (M. C. Rand, A. E. Greenberg & M. J. Taras, ed., published by American Public Health Assoc., Washington, D.C., 14 ed., 1976).

As above indicated, the addition of chlorine may be carried out inside the clarifier itself, or on the effluent removed from the clarifier; and it will be understood that the term "effluent" as used herein will apply broadly to the clarified liquid obtained from the settling of the sludge in a clarifier whether partially or fully clarified, and whether remaining in the clarifier or removed from it. The chlorine-treated effluent, with a TRC content of at least 0.1 ppm, will be held for a period of at least one minute before it is further treated e.g. to reduce the pH of the effluent and bring it closer to environmental requirements. While in many cases, a TRC of 0.1 ppm and a residence time of one minute, will be sufficient to substantially destroy all microorganisms, including all fecal coliforms and fecal streptococci present, in some cases there may be advantage in using higher residual chlorine, and/or a higher residence time to obtain the desired bactericidal effect. A preferred TRC range would be between 0.1 and 1.0 ppm.

Treatment with chlorine in the manner described, notably carrying out the chlorination while the effluent is at a pH at least 11.0 has been found particularly effective in that the treatment not only destroys practically completely coliform bacteria with a relatively low chlorine dose, but also reduces very markedly the danger of objectionable chlorine compounds being formed, particularly chloramine or chlorinated hydrocarbons. Even though ammonia is generally present in the effluent, at this high pH it is weakly ionized and its reaction with the chlorine, which is present as hypochlorite, will be very slow. Similarly, hydrocarbon reactions with chlorine will be relatively slow at such high pH.

In most cases where the chlorinated effluent is to be returned to natural water, it is further treated to reduce its pH to a level suitable for the environment. This can be achieved by treatment with any suitable acid. A convenient treatment is by means of $CO_2$, as this will produce a precipitate of $CaCO_3$, relatively pure and easily settleable, which can be recovered, e.g. by settling in secondary clarifier, for a variety of possible uses. But the effluent from the secondary clarifier would still be at a pH of about 9-9.5, and a final adjustment of the pH to a lower value may be desirable if the water is to be released into a natural stream of a pH; say 7-7.5. The final pH adjustment will depend on the pH of the environmental streams to which the thus "neutralized" effluent is being added. It will be appreciated that many natural streams or lakes, nowadays have a pH lower than 7, due to phenomena such as "acid rain" or the like, and it may be desirable to release the clarified effluent at a pH higher than 7. Since it is a matter of choice dictated largely by environmental conditions, this final pH will be termed herein one of "an environmentally acceptable level".

In the particular embodiment of the invention shown diagrammatically in the drawing, raw sewage is continuously fed to a mixing tank where it is mixed with a lime slurry. The slurry is prepared, e.g. in a slurry tank, and fed to the mixing tank in appropriate quantity or at an appropriate rate, to bring the pH of the mixture to at least 11.0. Suitable mixing means are provided, both for the preparation of the slurry and for the mixing of the lime slurry with the sewage. The sewage-lime mixture is then passed into a flocculator where the major reactions of the lime with organic and inorganic substances take place and where the suspended or freshly precipitated solids agglomerate into larger particles that will have a greater tendency to settle. The mixture is then passed into a primary clarifier where the solids settle by gravity, forming a sludge.

The liquid effluent flowing out of the primary clarifier is then treated with chlorine as hereinabove described. While the addition of chlorine is represented in the Figure as a step following the settling in the primary clarifier, this being the preferred procedure, it will be understood that both steps can also be carried out simultaneously, e.g. when chlorination is carried out in the liquid in the clarifier itself. The sludge is removed and later disposed of in a suitable manner.

The chlorinated effluent is then passed into a carbonation unit where carbon dioxide is introduced into the liquid and reacts with the lime remaining in the liquid to form calcium carbonate. The carbonate is allowed to settle in a secondary clarifier and the now substantially clear liquid is further carbonated, or treated with sulfuric acid or with any other suitable acid, to adjust the pH as explained above, e.g. by bringing it substantially close to neutrality. The clarified and neutralized water is now ready to be returned to a stream or river or otherwise utilized for whatever purpose may be indicated.

The following Examples further illustrate the invention, it being understood that neither these examples nor the above drawing are to be interpreted as in any way limiting the scope of the invention.

EXAMPLES I–III

In a series of laboratory tests sewage was treated in accordance with the invention, namely: the raw sewage was treated with lime to a pH of 11.5, and allowed to settle, and the effluent, separated from the sludge, was treated with chlorine to a residual chlorine level respectively of 0.1 mg/l (treatment A), 0.5 mg/l (treatment B) and 1.0 mg/l (treatment C). The chlorine-treated effluent was held at the unchanged pH level of 11.5 for about one minute, then carbonated to a pH 9.3 and finally adjusted to a pH of approximately 7 and held at this pH for varying lengths of time, viz. 1, 10 and 30 minutes. Samples for bacteria counts were taken at the end of these 1, 10 and 30 minutes respectively. For comparison, the same raw sewage without the preliminary lime treatment (i.e. essentially at neutral pH), was allowed to settle and the effluent was chlorinated to the same residual chlorine level and held for 1 minute, after which a bacteria count was taken. In another comparison, the same sewage was treated with lime to a pH 11.5, and allowed to settle, without subsequent chlorination of the effluent, and a bacteria count of the effluent was taken after one minute. The raw sewage (which was the same in all experiments) had an average bacteria count per ml. as follows:

Total bacteria: $2.9 \times 10^5$
Total coliforms: $1.4 \times 10^5$
Fecal coliforms: $1.3 \times 10^4$
Fecal streptococci: $8.0 \times 10^2$ The resulting bacteria counts are shown in Table 1.

TABLE I

|  | Treatment a* | | | Chlorination only** | Lime only*** |
|---|---|---|---|---|---|
|  | 1 min. | 10 min. | 30 min |  |  |
| Total bacteria | $3.5 \times 10^0$ | $1.0 \times 10^0$ | nil | $1.7 \times 10^5$ | $2.1 \times 10^4$ |
| Total coliforms | nil | nil | nil | $6.1 \times 10^4$ | $1.2 \times 10^2$ |
| Fecal coliforms | nil | nil | nil | $3.1 \times 10^3$ | $4.0 \times 10^1$ |
| Fecal streptococci | nil | nil | nil | $4.0 \times 10^1$ | $2.2 \times 10^2$ |

*Treatment A: Effluent at pH 11.5 coming out of primary clarifier, chlorinated to a level to give a total residue of chlorine (TRC after 15 min) of 0.1 mg/l; maintained at these conditions for 1 minute; then pH lowered to 9.3 and kept at this pH for 30 minutes; then pH further lowered to 7.0 this pH for varying lengths of time, i.e. 1, 10 and 30 minutes. Samples for bacteria counts were taken at the 1, 10 and 30 minutes.
**Chlorination only Primary effluent chlorinated to TRC 0.1 mg/l without prior lime treatment.
***Lime only: Raw sewage treated with lime to pH 11.5 without subsequent chlorination.

TABLE I-continued

|  | Treatment B* | | | Chlorination only** |
|---|---|---|---|---|
|  | 1 min. | 10 min. | 30 min. |  |
| Total bacteria | $9.5 \times 10^0$ | $5.0 \times 10^0$ | $6.0 \times 10^0$ | $1.5 \times 10^5$ |
| Total coliforms | nil | nil | nil | $1.2 \times 10^2$ |
| Fecal coliforms | nil | nil | nil | $4.0 \times 10^1$ |
| Fecal streptococci | nil | nil | nil | $2.2 \times 10^2$ |

*Treatment B: Same as Treatment A except that chlorination was to 0.5 mg/l total residual chlorine
**Chlorination only: Primary effluent chlorinated to 0.5 mg/l TRC without prior lime treatment.

|  | Treatment C* | | | Chlorination only** |
|---|---|---|---|---|
|  | 1 min. | 10 min. | 30 min. |  |
| Total bacteria | $4.5 \times 10^0$ | $3.0 \times 10$ | $3.5 \times 10^0$ | $7.7 \times 10^4$ |
| Total coliforms | nil | nil | nil | $1.2 \times 10^2$ |
| Fecal coliforms | nil | nil | nil | $4.0 \times 10^1$ |
| Fecal streptococci | nil | nil | nil | $2.2 \times 10^2$ |

*Treatment C: Same as A, except that chlorination was to 1.0 mg/l TRC.
**Chlorine only Primary effluent chlorinated to 1.0 mg/l TRC without prior lime treatment.

EXAMPLES IV–VI

The procedure according to the invention was followed, substantially as in the preceding Examples, except that the chlorination of the lime treated sewage was carried out in the primary clarifier and not, as in previous examples, on the effluent removed from the clarifier. The effluent at a pH of 11.5 was chlorinated to residual chlorine levels of 0.1 mg/l (treatment A), 0.5 mg/l (treatment B) and 1.0 mg/l (treatment C), respectively, and the chlorinated sewage was held at the unchanged pH level of 11.5 for about 10 minutes, then carbonated and held at a pH of 9.3 for 30 minutes, and finally adjusted to pH 7 approximately and held at this pH respectively for 1, 10 and 30 minutes. As in previous examples comparisons were made with the treatment of the same sewage by only chlorinating to the same residual chlorine level (without preliminary lime treatment) and by only treating with lime (without chlorination). Samples were analyzed for bacteria content as before. The bacteria count is shown in Table II.

TABLE II

|  | Treatment A | | | Chlorination only | Lime only |
|---|---|---|---|---|---|
|  | 1 min. | 10 min. | 30 min. |  |  |
| Total bacteria | $6.5 \times 10^1$ | $2.1 \times 10^1$ | $3.5 \times 10$ | $9.1 \times 10^4$ | $8.9 \times 10^2$ |
| Total coliform | $1.0 \times 10^0$ | $1.0 \times 10^0$ | nil | $1.6 \times 10^4$ | $5.5 \times 10^4$ |
| Fecal coliforms | nil | nil | nil | $2.6 \times 10^2$ | $0.5 \times 10^0$ |
| Fecal streptocci | $6.5 \times 10^0$ | nil | nil | $3.5 \times 10^0$ | $1.2 \times 10^1$ |

|  | Treatment B | | | Chlorination only |
|---|---|---|---|---|
| Total bacteria | $3.5 \times 10^2$ | $1.3 \times 10^1$ | $13. \times 10$ | $7.8 \times 10^4$ |
| Total coliforms | $3.5 \times 1$ | nil | nil | $7.0 \times 10^3$ |
| Fecal | $2.5 \times 10$ | nil | nil | $1.7 \times 10^2$ |

TABLE II-continued

| | | | | |
|---|---|---|---|---|
| coliforms | | | | |
| Fecal streptococci | $9.5 \times 10^2$ | nil | nil | nil |

| | Treatment C | | | Chlorination only |
|---|---|---|---|---|
| Total bacteria | $2.9 \times 10^1$ | $9.0 \times 10^1$ | $8.0 \times 10$ | $2.8 \times 10^3$ |
| Total coliforms | nil | nil | nil | $1.4 \times 10^2$ |
| Fecal coliforms | nil | nil | nil | nil |
| Fecal Streptococci | nil | nil | nil | nil |

EXAMPLES VII–IX

The procedure of Examples IV–VI was used except that the lime-treated and chlorinated sewage was held after chlorination (and prior to carbonation) for 30 minutes. The bacteria count is shown in Table III.

TABLE III

| | Treatment A | | |
|---|---|---|---|
| | 1 min. | 10 min. | 30 min. |
| Total bacteria | $1.7 \times 10^1$ | $8.0 \times 10^4$ | $4.0 \times 10^0$ |
| Total coliforms | $0.5 \times 10^0$ | nil | nil |
| Fecal coliforms | nil | nil | nil |
| Fecal streptococci | nil | nil | nil |
| | Treatment B | | |
| Total bacteria | $1.1 \times 10^2$ | $14 \times 10^1$ | $4.0 \times 10^0$ |
| Total coliforms | $0.5 \times 10^0$ | nil | nil |
| Fecal coliforms | nil | nil | nil |
| Fecal streptococci | $4.0 \times 10^0$ | nil | nil |
| | Treatment C | | |
| Total bacteria | $2.1 \times 10^1$ | $8.5 \times 10^0$ | $8.5 \times 10^0$ |
| Total coliforms | nil | nil | nil |
| Fecal coliforms | nil | nil | nil |
| Fecal streptococci | nil | nil | nil |

EXAMPLES X–XII

The procedures of Examples IV–VI was followed except that the lime-treated and chlorinated sewage was held after chlorination (and prior to carbonation) for 120 minutes. The bacteria count is shown in Table IV.

TABLE IV

| | Treatment A | | |
|---|---|---|---|
| Total bacterial | $9.5 \times 10^0$ | $8.5 \times 10^0$ | $3.5 \times 10^0$ |
| Total coliforms | nil | nil | nil |
| Fecal coliforms | nil | nil | nil |
| Fecal streptococci | nil | nil | nil |
| | Treatment B | | |
| Total bacteria | $6.5 \times 10^0$ | $1.3 \times 10^1$ | $6.0 \times 10^0$ |
| Total coliforms | nil | nil | nil |
| Fecal coliforms | nil | nil | nil |
| Fecal streptococci | nil | nil | nil |
| | Treatment C | | |
| Total bacteria | $1.7 \times 10^1$ | $7.0 \times 10^0$ | $6.0 \times 10^0$ |
| Total coliforms | nil | nil | nil |
| Fecal coliforms | nil | nil | nil |
| Fecal streptococci | nil | nil | nil |

EXAMPLE XIII

This example illustrates the influence of the pH at chlorination on the resultant water quality.

Lime was added to a sewage sample until the pH of the sample was 11.5, held for 15 minutes to permit setling before reducing the pH to 9.5, at which pH the sample was chlorinated to a TRC of 0.25 ppm, held for 15 minutes before the total bacteria (TPC) and total coliform (TC) counts were taken. This procedure is referred to hereafter as treatment D.

Treatment E of the sewage sample, in accordance with the present invention was carried out as follows: lime was added to the sewage sample until the pH of the sewage sample was 11.5, held for 15 minutes to permit setling before chlorination to a TRC of 0.25 ppm and for another 15 minutes after chlorination before the measurement of the TPC and TC. The results of these experiments are summarized in Table V below.

The experimental results show the difference between chlorinating the sewage at pH 11.5 and chlorinating the sewage after reducing the pH from 11.5 to 9.5, with a settling time of 15 minutes at pH 11.5 in both cases.

TABLE V

| Parameter Measured | (counts) 100 ml | Raw Sewage | Treatment D | Treatment E |
|---|---|---|---|---|
| (1) | Total Bacteria (TPC) | $1.4 \times 10^9$ | $5.1 \times 10^4$ | $7.1 \times 10^3$ |
| (2) | Total Coliform (TC) | $1.2 \times 10^7$ | $3.5 \times 10^0$ | 0 |

EXAMPLE XIV

This example illustrates the effect of lime treatment and chlorination of the sewage at pH's of 11.0 and 11.5 according to the present invention.

The pH of the raw sewage sample was initially adjusted to 11.0 by the addition of lime, at which pH it was held for an hour, following which it was chlorinated to a TRC of 0.2 mg/l and the pH reduced to 9.5 by passing carbon dioxide through the sample. The total plate count, the total coliform count and the fecal coliform count (all in counts/100 ml) were taken. These are tabulated in Table VI below.

This procedure was repeated with an initial pH of 11.5. It was found that pH's of 11.0 and 11.5 were equivalent in their disinfectant ability for this particular sewage sample.

TABLE VI

| Parameter Measured | Raw Sewage | Initial pH on liming the sewage | |
|---|---|---|---|
| | | 11.0 | 11.5 |
| 1. | Total Plate | | | |

TABLE VI-continued

| Parameter Measured | | Raw Sewage | Initial pH on liming the sewage | |
|---|---|---|---|---|
| | | | 11.0 | 11.5 |
| | Count (counts/ 100 ml) | $3 \times 10^{10}$ | $3.3 \times 10^4$ | $4.8 \times 10^4$ |
| 2. | Total Coliform (counts) (100 ml) | $9.3 \times 10^7$ | $1.1 \times 10^0$ | $1.1 \times 10^0$ |
| 3. | Fecal Coliform (counts) (100 ml) | $3 \times 10^6$ | nil | nil |

The description and examples presented above are for the purpose of providing a complete disclosure of the invention and alterations and modifications thereof may occur to those skilled in the area. Therefore I do not wish to be limited to the embodiments described above, but only by the scope of the appended claims.

What I claim is:

1. A process of treating sewage containing microorganisms including bacteria, coliforms, and streptococci which comprises the steps of:
    (a) mixing said sewage with a material containing a compound of the group consisting of calcium oxide and calcium hydroxide thereby to form a mixture having a pH of at least 11.0, said mixture containing solids in suspension in a liquid,
    (b) treating said mixture to separate at least a portion of said solids from said liquid,
    (c) treating said liquid with chlorine at said pH of at least 11.0 for at least 1 minute to obtain a total residual chlorine content (TRC) in said liquid of at least 0.1 parts per million and to substantially destroy said micro-organisms, and
    (d) adjusting the pH of said liquid to an environmentally acceptable level.

2. The process of claim 1, where said pH is at least 11.5.

3. The process of claim 1 wherein said mixture is treated to separate said solids from said liquid by passing said mixture into a clarifier and allowing solids to settle out of suspension in said clarifier.

4. The process of claim 1 wherein said liquid is treated with chlorine until the total residual chlorine content (TRC) of said liquid is 0.1 to 1.0 parts per million.

5. The process of claim 1, wherein the chlorine is chlorine gas.

6. The process of claim 1, wherein said adjusting of the pH of said chlorine-treated liquid comprises, in a first step, contacting said chlorine-treated liquid with carbon dioxide until the pH of said chlorine-treated liquid is about 9 to 9.5 and, in a second step, adjusting the pH of said chlorine-treated liquid to an environmentally acceptable level.

7. A continuous process for treating sewage containing micro-organisms including bacteria, coliforms, and streptococci and recovering a purified and disinfected effluent therefrom comprising:
    (a) continuously passing said sewage to a mixing zone,
    (b) adding a material containing a compound of the group consisting of calcium oxide and calcium hydroxide to said zone,
    (c) forming in said zone an intimate mixture of said sewage and said material, said mixture having a pH of at least 11.0 and containing solids in suspension in a liquid,
    (d) passing said mixture to a clarification zone,
    (e) treating said mixture in said clarification zone to separate at least a portion of said solids from said liquid,
    (f) treating said liquid with chlorine at said pH of at least 11.0 for at least 1 minute thereby to obtain a total residual chlorine content (TRC) in said liquid of at least 0.1 parts per million and to substantially destroy said micro-organisms,
    (g) passing said chlorine treated liquid to a pH reduction zone,
    (h) reducing the pH of said liquid to an environmentally acceptable level.

8. The process of claim 7, where said wastewater is treated with chlorine in said clarification zone.

9. The process of claim 7, where said pH is at least 11.5.

10. The process of claim 7 wherein said liquid is passed from said clarification zone to a chlorinating zone and treatment of said liquid with chlorine is carried out in said chlorinating zone.

11. The process of claim 7 wherein said chlorine is chlorine gas.

12. The process of claim 7 wherein said chlorine-treated liquid in said pH reduction zone is treated to reduce the pH of said liquid in two steps, the first step comprising contacting said liquid with carbon dioxide until the pH of said liquid is about 9 to 9.5 and removing calcium carbonate precipitated in said liquid and second step comprises adjusting the pH of said chlorine-treated liquid to an environmentally acceptable level.

13. The process of claim 7, wherein said chlorine-treated liquid from said pH reduction zone is released into the environment.

* * * * *